United States Patent
Lehr (10) Patent No.: US 11,475,361 B2
(45) Date of Patent: Oct. 18, 2022

(54) AUTOMATED PROCESS EXECUTION BASED ON EVALUATION OF MACHINE LEARNING MODELS

(71) Applicant: SAP SE, Walldorf (DE)

(72) Inventor: Dennis Lehr, Walldorf (DE)

(73) Assignee: SAP SE, Walldorf (DE)

( * ) Notice: Subject to any disclaimer, the term of this patent is extended or adjusted under 35 U.S.C. 154(b) by 566 days.

(21) Appl. No.: 16/598,117

(22) Filed: Oct. 10, 2019

(65) Prior Publication Data

US 2021/0110293 A1 Apr. 15, 2021

(51) Int. Cl.
| | |
|---|---|
| G06N 20/00 | (2019.01) |
| G06K 9/62 | (2022.01) |
| G06N 5/00 | (2006.01) |

(52) U.S. Cl.
CPC ............. *G06N 20/00* (2019.01); *G06K 9/626* (2013.01); *G06K 9/6282* (2013.01); *G06N 5/003* (2013.01)

(58) Field of Classification Search
CPC ........ G06N 20/00; G06N 5/003; G06K 9/626; G06K 9/6282
See application file for complete search history.

(56) References Cited

U.S. PATENT DOCUMENTS

| | | | |
|---|---|---|---|
| 2019/0251469 A1* | 8/2019 | Wagstaff | G06N 20/20 |
| 2021/0241177 A1* | 8/2021 | Wang | G06N 20/20 |

OTHER PUBLICATIONS

U.S. Appl. No. 16/558,444, filed Sep. 3, 2019, Lehr.
Mashayekhi et al., "Rule extraction from random forest: the RF+HC methods" Canadian Conference on Artificial Intelligence. Springer, Cham, Jun. 8, 2015, 15 pages.

* cited by examiner

*Primary Examiner* — Phuoc Tran
(74) *Attorney, Agent, or Firm* — Fish & Richardson P.C.

(57) ABSTRACT

The present disclosure relates to computer-implemented methods, software, and systems for utilizing tools and techniques for identifying process rules for automated execution of instances of a process workflow. One example method includes extracting rules from a machine learning model for prediction of execution results of process workflow instances. Metrics defining coverage and accuracy of the rules are calculated. The rules are evaluated according to the metrics and are reduced to a first set of rules that are provided for further evaluation. A rule from the first set of rules is determined to be incorporated into process rules defined for the process workflow at a process execution engine. The process rules associated with execution of the process workflow are updated to include the first rule and to generate a process result automatically according to the first rule when the instance complies with prerequisites defined at the first rule.

20 Claims, 4 Drawing Sheets

AUTOMATED PROCESS EXECUTION BASED ON EVALUATION OF MACHINE LEARNING MODELS

TECHNICAL FIELD

The present disclosure relates to computer-implemented methods, software, and systems for automated data processing in a process management environment.

BACKGROUND

Software application may execute processes in relation to providing user-requested services. Processes may be defined as workflows that include multiple steps taking input and providing output. A process may be implemented in different manner to represent a common scenario. For example, an approval process may be implemented in relation to different use cases, such as a purchase requisition process, a leave request approval process, an expenditure approval process, etc. These use cases may be implemented to include multiple steps including one or more approval steps. An approval process may have different implementations for different use case depending on implementation and business requirements.

SUMMARY

The present disclosure involves systems, software, and computer implemented methods for utilizing tools and techniques for providing process rules that can be used for automation of process executions at an execution engine running on service infrastructure.

One example method may include operations such as extracting a plurality of rules from a machine learning model for prediction of execution results of instances of a process workflow; calculating metrics for the plurality of rules, wherein the metrics define coverage and accuracy of the plurality of rules according to historical data used for generating the machine learning model; based on an evaluation of the plurality of rules according to the metrics and a predetermined criteria, reducing the plurality of rules to determine a first set of rules from the plurality of rules to be provided for evaluation and determination of a first rule to be incorporated into process rules defined for the process workflow at a process execution engine; in response to providing the first set of rules for the evaluation and determination, receiving a selection of the first rule from the first set of rules; and updating process rules associated with execution of the process workflow to include the first rule as a predefined rule for automatic processing of an instance of the process workflow and generating a process result according to the first rule, wherein the instance of the process workflow complies with prerequisites defined at the first rule.

Implementations can optionally include one or more of the following features. In some instances, the machine learning model for predicting of the process workflow may be generated. The machine learning model comprises a plurality of decision trees to implement logic for evaluation of process data for an instance of the process workflow and to determine predicted output, and wherein the plurality of decision trees include the plurality of rules for data evaluation.

In some instances, the machine learning model may be trained over the historical data to determine the plurality of rules and the plurality of decision trees, wherein the historical data is collected at one or more systems where instances of the process workflow were executed.

In some instances, the calculated metrics include coverage metrics and accuracy metrics correspondingly defined for the plurality of rules, wherein a coverage metric is determined for a first rule from the plurality of rules to identify an amount of data from the historical data that complies with the rule, and wherein an accuracy metric is determined for the first rule to identify whether a predicted result acquired according to the first rule corresponds to an actual result as included in the historical data.

In some instance, at a user interface application on a display device, the first set of rules are provided for further evaluation for implementation in the process rules defined for the process workflow.

In some instances, the first rule is implemented at an process execution engine for automated execution of the instance of the process workflow, wherein the instance of the process workflow defines a process scenario corresponding the first rule, and wherein the process result is automatically generated during runtime of the process workflow at the process execution engine.

In some instances, an updated machine learning model is trained over a set of the historical data. The set is determined by excluding data related to the first rule from the historical data, and wherein the machine learning model is updated to generate an updated machine learning model excluding the first rule from the plurality of rules.

In some instances, the historical data is collected and updated iteratively. The rules persisted in the machine learning model after updating the machine learning model to exclude the first rule are evaluated iteratively according to the iteratively collected historical data.

In some instances, the machine learning model is updated to exclude the first rule from the plurality of rules.

In some instances, the instance of the process workflow is executed at a platform infrastructure implementing execution logic for the process workflow. The process workflow is an approval process workflow and the instance of the approval process workflow is executed automatically without manual input to generate an approval process result when input data for executing the instance comply with the first rule.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The present disclosure describes various tools and techniques for providing process rules that can be used for automation of a process execution. A machine learning model may be enhanced to support an intelligent and automated process execution according to determined rules from the data model that can be deployed productively and provide reliable results with high accuracy rates. Automated process execution results may be generated for a particular instance of a process execution at a service infrastructure environment. Input for starting and executing the instance is provided at the environment where the process is running.

In some instances, a process instance may be triggered in productive mode by receiving input, such as a user input. The input may be associated a particular use case that may be evaluated according to process rules. Based on the implementation of the logic of the process and defined rules for data processing during the process execution, a result from a triggered process may be acquired. The result from a process execution may require user manual interaction at one or more of the process steps or may be automated to provide a result without manual interaction. The process rules defined for a process may include rules that support automatic process resolution when the rule is associated with particular use cases.

For example, a leave request process initiated in relation to a one day leave may be associated with an automatic approval resolution to save on processing time and manual interaction. In another example, a leave request process initiated in relation to a two month extended leave may not be associated with an automatic resolution, but rather be processed according to complex rules and subjective evaluation, e.g., performed by a people manager or a human resource specialist that may involve manual interaction.

In accordance with the present disclosure, a process instance may be an instance of an approval process, such as a purchase order process or a leave request process. The input for triggering a purchase order may include details for an ordered product or service, such as product name, quantity, price, etc. and also details for the purchase requestor. An example rule for automatic processing of such a process may be to approve requests for purchases triggered by a particular user with a predefined user type, e.g. developer. Further, a higher threshold criteria for automatic processing may be defined, such as for ordering laptops with a price below 3500 USD. As another example, automatic processing of a request for a purchase order process may be approve a purchase order when it is below a certain threshold value, for example, 500 USD.

Multiple process instances or scenarios may be associated with a generic workflow. The process scenarios may correspond to different use cases for implementing and executing the generic workflow. For example, an approval workflow may be interpreted as a generic workflow, where a leave request process may be a process scenario that is part of the generic workflow. In yet another example, a purchase requisition process is another example process scenario that may be also interpreted as part of the generic approval workflow. These process scenarios share common features and/or common execution steps, for example, approval steps. The process scenarios may be implemented at different productive systems where they run and provide services to users or other systems. The process scenarios may be implemented with different technologies and software/hardware requirement into application services running at software infrastructure. For example, cloud services implemented at a cloud platform infrastructure may be accessed via instantiated interfaces and received input to start a process execution instance.

During execution of instances of process scenarios related to a workflow, workflow data is generated. Such data may be stored as historical data at relevant systems, and may be collected and evaluated for use by a machine learning service to provide predictive services and support process automation with improved accuracy.

In some instance, the workflow data for a workflow is generated during execution of instances of multiple process scenarios related to the generic workflow at different systems and according to different process requirements. The workflow data may be related to different use cases of the generic workflow. Therefore, a generic framework may be defined to include features associated with the workflow data. The features of the generic framework data may be defined as variables with correspondingly stored data. The variables may be associated with dependent and independent data. For example, process execution results, such as a final result of an approval process—namely approved or not approved, is a dependent variable. The dependent variables may be evaluated in the context of the independent variables according to machine learning logic to provide prediction for the dependent variables. Within a given generic framework, multiple dependent and multiple independent variables may be defined. When prediction results of a machine learning logic correspond to accuracy levels acceptable for implementation in a process automation logic, rules determined through the machine learning techniques may be implemented as processing rules for process automation.

To provide automation services in relation to a process execution, for example, of an approval process workflow implemented at a cloud platform, data related to multiple process scenarios may be utilized. Such data may be historical data from past executions of instances of these scenarios. When a process scenario instance is to be evaluated by machine learning logic to determine a predicted result for a process scenario outcome, data related to the particular process scenario instance may also be taken into consideration. Such data may be related to the particular instance, e.g. input provided by a user or systems when triggering the process execution. Further, such data may include specific data related to a system environment and an operation environment where the process scenario instance is running. For example, such data may be customer-specific data related to data objects created in systems and applications related to the system where the process is executed. Such customer-specific data may be related to data objects or entities that are part of or related to steps from the process scenario execution.

In some instance, machine learning logic may be used for training received data such as historical data from past process workflow execution, and different rules may be identified. The rules may be related to observations of scenarios of process steps complying with certain conditions, or corresponding to particular input values or related to process specifics.

For example, within the example of leave request approval process, the process may be executed through a corporate portal application, where data stored in relation to an employee profile can be stored. Such employee data may be store in a related human resource application or administrative database or system that is associated with the corporate portal application. The leave request approval process may be also associated with performance data stored for the employee. Therefore, data related to the approval process may be also related to data stored in other systems. For example, such data may be stored at another separate system, or in a related module of a platform providing multiple services in relation to employees. The customer-specific data may be related to the process execution and may not be stored as part of the workflow data for process execution and tracked in the historical data. When such data is used to determine machine learning models, decision trees may be generated that provide associations of rules that correspond to observations identified in the data.

Applying machine learning techniques in the context of process execution may provide different benefits for system improvements in process environments. For example, based on predictive services that can be provided based on machine learning implemented logic, a decision support system for automation of process execution or sets of tasks within a process may be provided. Such implementation of machine learning techniques to enhance process rules and process execution may improve system performance as resource spending can be allocated more efficiently and at the same time may provide services in a timelier manner.

In some instances, a machine learning model may be implemented to evaluate input data for a process instance and provide an outcome, i.e. a predicted result. For example, such a machine learning model may be implemented for predicting the outcome of an approval workflow, such as a leave request process, product requisition process, etc. Such a machine learning model includes different decision tree structures that have a tree data structure where nodes are represented by decision rules, and edges provide relationships between the different rules and steps for evaluating the data according to multiple rules in a sequence. These decision rules are associated with a level of accuracy of capturing observations of process outcomes based on used data for training the model.

A machine learning model includes multiple decision trees with decision rules that are calculated based on available historical data from executed instance of a process workflow. The process workflow may be a particular scenario implementation of a generic workflow that includes multiple scenarios having similar process features. For example, the machine learning model may be implemented for an approval process that can be any one of a leave request process, process requisition, or other process that provides as a result a Boolean outcome corresponding to yes (approved) or no (not approved).

In some instances, a machine learning model that may be implemented to predict outcomes of initiated approval workflow instances may be invoked. The machine learning model may be a decision-tree-based classification model that predicts whether a workflow will be approved or not. The model includes different decision trees that have decision rules calculated based on used historical data.

The performance of services based on a machine learning model may be related to performance measures of the multiple decision trees that may be extracted from the model that is generated based on the performed training. The decision trees may be associated with quantitative properties such as precision, data coverage, and model complexity.

For example, models that provide outcome prediction results with high accuracy include decision trees that are with a high precision, that means that almost all of the historical data that is used for training the model complies with the rules within the decision trees and the decision trees as a whole. In such manner, when data such as data from the historical data is used to determine a process outcome, a predicted result by the machine learning model corresponds to a process result as stored in the historical data.

Also, coverage of historical data used for training a machine learning model may be used to measure performance of the decision trees and included rules that are extracted from the machine leaning model. For example, better performance measure of a rule from the extracted rules may be associated with higher coverage of the rule over training data. For example, a threshold value of coverage may be defined and machine learning rules may be evaluated base on such a comparison with the threshold, for example, 95% or 99% coverage expected.

In some instances, when the complexity of decision trees within a machine learning model is low, performance of the machine learning model to predict results may be expected to be higher. The complexity of decision trees may be associated with a number of decision nodes within a given tree. For example, a decision tree should have few decision nodes to be considered with low complexity.

In accordance with implementations of the present disclosure, decision trees part of the machine learning model may be invoked and decision rules may be extracted. Such decision rules may be evaluated to determine quality of a machine learning model and model prediction functionality. An algorithm may be implemented at a system deploying a software service where a process workflow is running, to evaluate precision, coverage and complexity of decision trees part of a machine learning model.

Once decision trees are evaluated according to algorithm implemented logic for evaluation, decision rules may be filtered to determine a set of decision rules that correspond to acceptable performance and accuracy criteria defined for a workflow. Such set of decision rules may be further displayed to a workflow expect to perform evaluation of the rules and to determine one or more of these rules that can be implemented as process rules for the workflow that can be used for automatic execution of instances of the process workflow. When a rule from the set of rules is selected, the decision rule may be implemented in a process rules logic implemented module as part of the service logic for a service executing the process workflow corresponding to the machine learning model. In such manner, when a new instance of a process workflow is executed at the service infrastructure, and when the new instance complies with conditions defined at the decision rule, the execution of the new instance may be automated to provide a result without manual intervention. When the process execution is trigger, an automatic result is provided for the process outcome that follows the logic of the decision rule.

For example, the rule may define a condition for approving a leave request, i.e. request for less than 2 days should be approved, request for more than 2 days should be reviewed by person A with a particular process role. In such an example, a process instance that may be initiated for execution where process input defines a request for leave for a single day, the leave request process is automatically processed to provide an approval result. However, when a leave request is for 3 days, then the process would be evaluated according to the rule condition that such a request is to be further manually evaluated. Such a rule covers two scenarios where one of the scenarios—a first one where the initiated process execution request complies with the rule and an automatic resolution of the process execution may be achieved and a result may be generated in an automatic manner without manual interaction; and a second one where the request for initiating the process execution is associated with a process rule that requires manual interaction and cannot be executed to provide an automatic result.

In yet another example, the decision rule may be defined as a simple Boolean rule. For example, in the context of an approval leave request, when a condition is not complied with, the result of the process may be defined as "approved," and otherwise the result of the process is to be "rejected." The defined condition may be of different nature and related to the type of request, the type of requestor, characteristics of the requestors, parameters of the request, association of the request with another request, etc. When such a rule is implemented as part of the process rules, an instance of a process workflow execution that is associated with evaluation of that condition will be automates as the process execution result in both sub-scenarios of the rule is predefined and does not require manual interaction.

Figure 1:
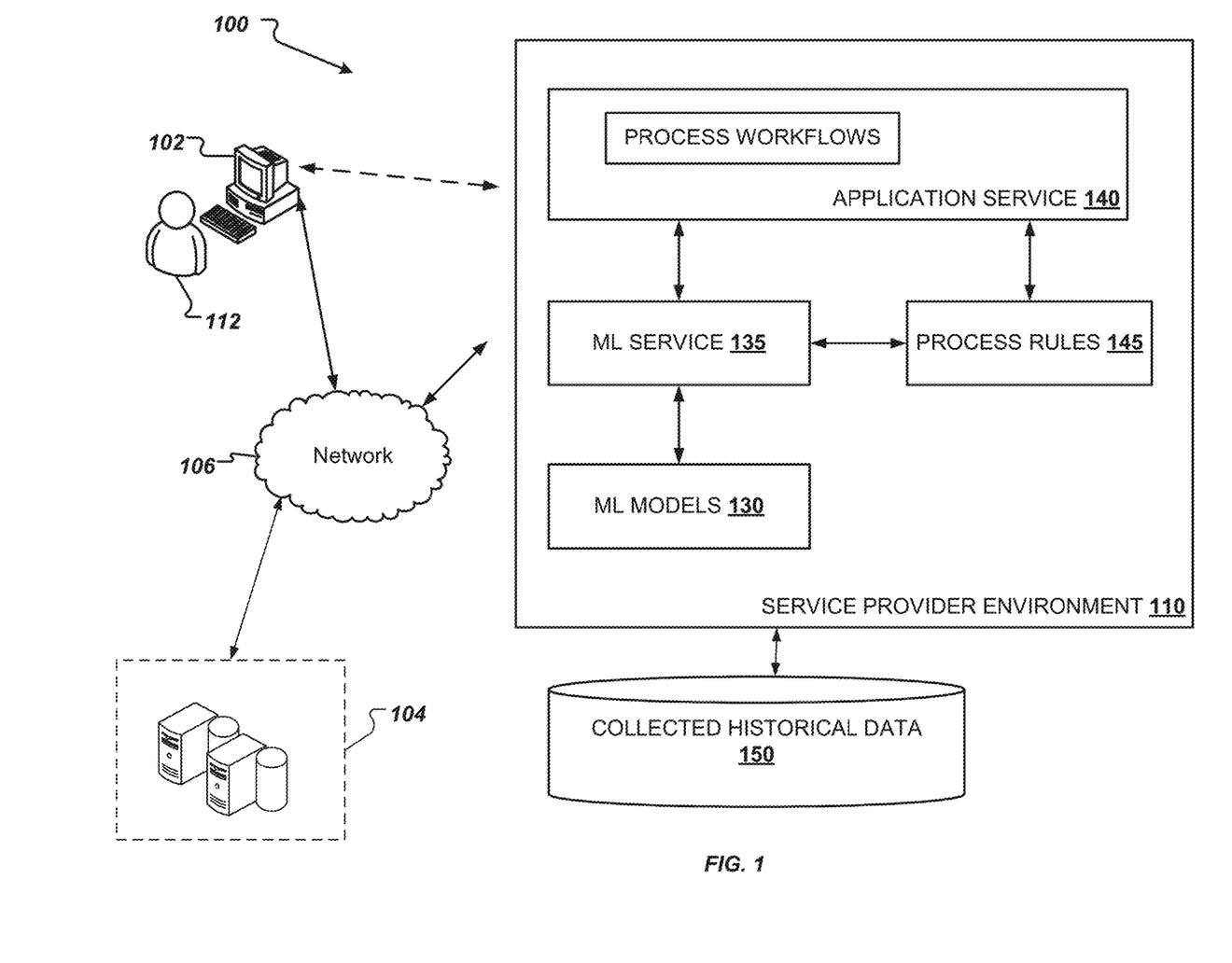
FIG. 1 illustrates an example computer system architecture that can be used to execute implementations of the present disclosure.

FIG. 1 illustrates an example computer system architecture 100 that can be used to execute implementations of the present disclosure. In the depicted example, the example computer system architecture 100 includes a client device 102, a network 106, and a host system 104, and a service provider environment 110. The host system 104 may include one or more server devices and databases, processors, memory. In the depicted example, a user 112 interacts with the client device 102.

In some instances, the service provider environment 110 is a hardware and software environment providing infrastructure and services that may run and provide user functionality. For example, different software applications including one or more services may be executed at the service provider environment 110. The service provider environment 110 is instantiated to support deployment and execution of applications and services. For example, the service provider environment 110 may be a cloud-based platform provided for hosting client applications that may consume platform provided services or other services deployed by different service providers.

In some examples, the client device 102 can communicate with the host system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the host system 104 includes at least one server and at least one data store. In the example of FIG. 1, the host system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the service provider environment 110 can host applications and services to provide requested functionality by the client device 102 or in relation to executions of applications running on the host system 104.

In some instances, the client device 102 requests execution of a service, such as application service 140. The application service 140 is provided at a service provider environment 110. The application service 140 may be implemented to execute a process instance according to a particular logic implementation of a process scenario. For example, the process scenario may be a leave request approval process, as previously discussed. The process scenario that can be executed through the application service 140 may include a number of process steps in relation to reviewing a request for leave by an employee. In the present example, the user 112 may be an employee who requested five days of vacation within a particular time period through accessing a user interface provided for the application service 140. The leave request may be evaluated according to the logic of the application service 140 and implemented process rules 145. The process rules 145 for the application service 140 may include rules related to automatic process resolution. For example, a rule may define a condition that when met a process instance result is automatically executed to approval, or vice versa.

The application service 140 may be executed multiple times in relation to different request with different request parameters and different process outcome. When the application service executes an instant process scenario, data is stored for the process execution. The data that is stored may be such as the data of a workflow as previously discussed. Data stored for executions of the application service 140 may be provided to a collected historical data 150.

In some instance, the collected historical data 150 is a data storage that is managed to collect process scenario execution data associated with different process request executions. Such collected data may be used to train a machine learning model to provide predictive services for process execution results and provide insight on execution logic to be implemented within the logic of the application service 140 to be used for automatic process execution.

In some instances, the service provider environment 110 may be associated with an implemented machine learning service 135 that implement logic for provided intelligent data preparation for execution of predictive functionality in relation to process execution of the application service 140. The machine-leaning service 135 may be associated with machine learning models 130. The machine learning models 130 include models that may be used for providing predictive results for process executions at the application service 140.

The machine learning models 130 may include models that include decision trees where decision rules are arrange within nodes of a tree structure and edges provide relationships between rules within a decision logic implemented for data evaluation in the machine learning models 130. For example, the machine learning models may be such as the models discussed above that include decision trees.

In some instances, the models at the machine learning models 130 may be evaluated based on different qualitative and quantitative parameters to evaluate performance of prediction of the generated models. As discussed above, rules extracted from a model from the machine learning models 130 may be evaluated in relation to precision, data coverage, and complexity.

Based on computations of metrics for the decision trees and decision rules part of a model from the machine learning models 130, a selection of decision rules may be performed and these selected decision rules may be input and implemented as part of process rules 145 to be used during process execution.

In some implementations, validation of results provided through the machine learning service 135 may be also evaluated to meet certain criteria. Such criteria may be quantified with threshold levels for different metric. For example, a threshold value may be defined for data coverage or precision of rules based on comparison of results generated through the model and actual results (e.g. those stored in training data).

In some instances, the predictive functionality that may be provided by the machine learning service 135 based on the machine learning models 145 may be utilized to automate execution of processes at the application service 140. In such manner, the performance of the service provider environment 110 may be improved, and fewer interactions with external systems and/or user may be performed, while process execution may be performed without delays and with expected quality.

In some instances, part of the machine learning logic can be deployed into productive use, either manually or automatically, to automate execution of process instances running at the service provider environment 110. For example and as discussed above, one or more decision rules from decision trees part of the machine learning models 130 may be extracted and implemented as part of the application service logic in relation to a particular process workflow. For example, a decision rules from a model of the ML models 130 may be evaluated and selected to be incorporated into the process rules 140 based on meeting a predefined criteria. The criteria for selecting a decision rule may be based on qualitative and quantitative parameters, and also may be associated with manual interaction of a process analyzer or responsible process manager. The decision rules that may be implemented in the process workflow logic. As the decision rules are extracted from a machine learning model, the rules may be associated with better understanding of the process workflow that is not apparent when the process workflow is designed and implemented. Such insight in the process logic as captured by the machine learning techniques provide support for improved execution of process workflows.

In some instances, as decision rules of machine learning models may be measured according to metric for the rules including coverage and accuracy of the rules according to the historical data used for generating the model, the decision rules may be provided for further evaluation by a process owner responsible for the process workflow execution. In such manner, process executions may be monitor and associated process rules, such as process rules 145 may be adjusted.

In some instances, further rules may be defined that exactly correspond to rules identified by the machine learning models. In further examples, new rules can be defined to be added to the process rules 145 that may be based on captured process execution scenarios and trends that do not correspond with expected process flow.

By integrating a machine learning services to work with service implementations at a service provider's environment, a customer, such as an end user, may be provided with automated intelligence for process execution without requesting for manual support, for example, from an end user of the application service 140.

Figure 2:
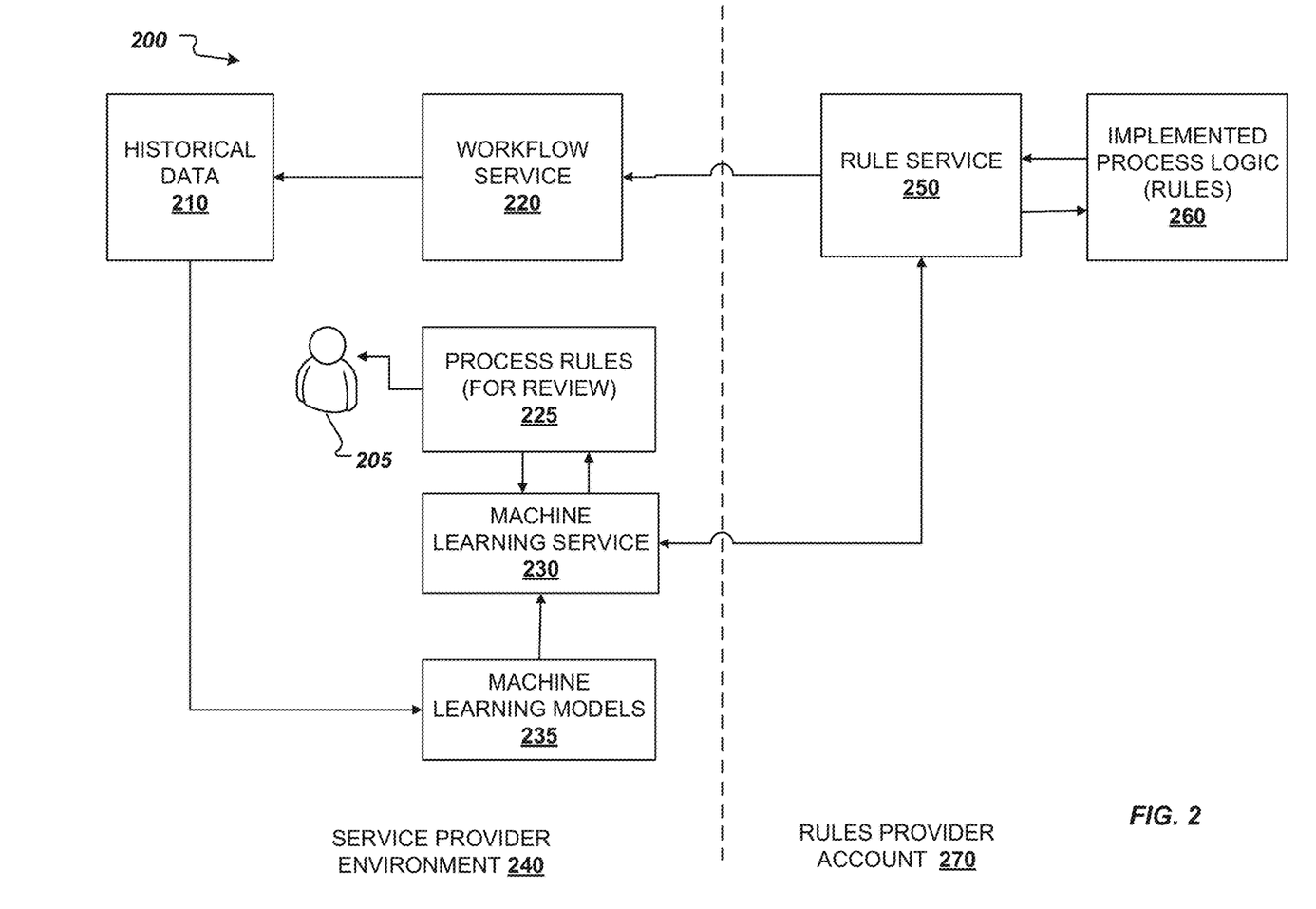
FIG. 2 is a block diagram illustrating an example system for determining process rules for automatic generation of a result from a process scenario in accordance with implementations of the present disclosure.

FIG. 2 is a block diagram illustrating an example system 200 for determining process rules for automatic generation of a result from a process scenario in accordance with implementations of the present disclosure. The example system 200 includes a service provider environment 240 and a rules provider account 270 part. The system 200 may correspond to the example computer system architecture 100 at FIG. 1.

At the service provider environment 240, a workflow service 220 is implemented. The workflow service 220 may be such as application service 140, FIG. 1. The workflow service 220 may be implemented at a cloud environment, where the service implementation is associated with process rules for execution workflow logic and providing results to requested process instances.

In some instances, the workflow service 220 is associated with a rule service 250. The rules service has an implemented process logic 260 including rule. The rules may be provided definitions covering multiple use case scenarios of different process execution routes.

The workflow service 220 may provide a user interface to provide interaction with service user and/or service administrators. The workflow service 220 may be running at the service provider environment 240. The workflow service 220 may be a stand-alone application, such as a leave request application, or may be an application module part of a general application system, for example, related to human resource services provided to employees. In relation to providing leave request services, or human resource processes, including a process for handling leave requests, data related to the customer, internal policies, rules, and configuration, and other employee related information may be stored as data related to the workflow service 220.

The historical data 210 may be data collected from executions of process scenarios or use cases associated with a workflow service, such as the workflow service 220. For example, the historical data 210 may be such as the collected historical data 150, FIG. 1.

In accordance with implementations of the present disclosure, the service provider environment 240 may be set up to provide a software and/or hardware environment for executing instances of workflows implemented by the workflow service 220. The service provider environment may be associated with an implemented machine learning service 230 that provides logic for intelligent data preparation for executing predictive functionality in relation to process execution at the workflow service 220. In some implementations, the machine learning service may be running outside of the service provider environment 240 and communicate over a network with the workflow service 220 to provide predictive functionality.

The machine leaning service 230 may be associated with machine learning models 235. The machine learning models 235 include implementations of machine learning algorithms that may be used for providing predictive results for process executions at the workflow service 220. The machine learning models 235 may include decision trees where decision rules are organized in nodes of a tree structure to cover different process scenarios of a workflow process instance execution.

When the user requests to execute a workflow service instance through the functionality provided by the workflow service 220, prediction functionality provided by the machine learning service 230 may be triggered. The generated machine learning models 235 may be evaluated. As discussed, rules from the machine learning models 235 may be extracted and they can be evaluated based on their quantitative and qualitative characteristics in relation to prediction accuracy, data coverage, and complexity. As discussed above, the machine learning models 235 may comprise decision trees including decision rules.

In some instances, multiple decision rules may be extracted from the decision trees comprised in a machine learning model from the machine learning models 235 corresponding to the workflow service 220. The extracted decision rules may be evaluated as discussed above and in relation to FIG. 1, FIG. 2 and FIG. 3.

In one example, Table 1 includes a dataset includes data for survival of passengers at a crashed ship (e.g. Titanic).

TABLE 1

| Pass. ID | Surv. | P-class | Name | Sex | Age | SibSp | Parch | Ticket | Fare | Cabin | Embarked |
|---|---|---|---|---|---|---|---|---|---|---|---|
| 1 | 0 | 3 | Mr. Braund | M | 22 | 1 | 0 | A/521171 | 7.2500 | NaN | S |
| 2 | 1 | 1 | Mrs. Curnings | F | 38 | 1 | 0 | PC17599 | 17.2833 | C85 | C |
| 3 | 1 | 3 | Miss Heikkinen | F | 26 | 0 | 0 | STON/02.310 | 7.9250 | NaN | S |
| 4 | 1 | 1 | Mrs. Futreille | F | 35 | 1 | 0 | 113803 | 53.1000 | C123 | S |
| 5 | 0 | 3 | Mr. Allen | M | 35 | 0 | 0 | 373450 | 8.0500 | NaN | S |
| 6 | 0 | 3 | Mr. Moran | M | NaN | 0 | 0 | | 8.4583 | NaN | C |

The data at Table, i.e. the titanic dataset as an example for an approval workflow, as it is a classification problem related to determining whether the passengers survive or not. The data set at Table 1 features such as Pclass, ticket class, name, sex, age, where the passenger embarked, etc. The column "Survived" displays the outcome, so whether the person survived (1) or not (0). A machine learning model including a decision tree may be trained on input data, such as the data in Table 1. The data in Table 1 may be generated based on some preprocessing steps, for example, enhancing the data to include NaN values in the "Cabin" column and others. When a machine learning model is generated based on training over the input data, decision trees including decision rules are created. The decision rules may be extracted from the machine learning model and may be evaluated for their precision, coverage and complexity.

Table 2 describes an example decision tree.

TABLE 2

Decision tree 1:

IF Sex = 'female' AND
SibSp = '0' AND
Pclass = '1' AND
Age IN RANGE [28,38]
THEN PREDICT 1
WITH PRECISION 1.0 AND COVERAGE 0.01

In an example scenario and based on the used historical data for training, the decision tree at Table 2 may be determined to have a precision of 100% with a coverage of 1%, i.e. 1% of the historical data available follows this rule and 100% of all the data following that rule are surviving.

The complexity may be determined to be four, as four decisions take place in this tree.

Table 3 describes another example of a decision tree.

TABLE 3

Decision tree 2:

IF Sex = 'female' AND
Fare IN RANGE [53,512] AND
Pclass = '1'
THEN PREDICT 1
WITH PRECISION 1.0 AND COVERAGE 0.08

Decision tree as presented at Table 3 includes a precision of 100% with a coverage of 8% and a complexity of three, as it has a higher coverage and a lower complexity than the decision tree presented at Table 2.

In another example, a decision tree may be defined as described in Table 4.

TABLE 4

Decision tree 3

IF Sex = 'male' AND
Pclass = '3' AND
Cabin = 'false' AND
Parch = '0'
THEN PREDICT 0
WITH PRECISION 1.0 AND COVERAGE 0.33

Decision tree 3 as presented at Table 4 has a precision of 100% with a coverage of 33% and a complexity of four.

In some instances, based on evaluations of decision trees and incorporated rules according to precision, coverage, and complexity, a set of the decision rules may be determined to correspond to trends in the data that may be considered as candidates for process automation. For example, the evaluation of the decision rules and trees may be performed according to predefined criteria for the preciseness, coverage, and complexity. The criteria may be defined with corresponding threshold values, that may be defined as percentage values that comply with process definition and execution performance expectations.

Based on the process rules evaluation, some of the rules may be presented to an end user to review and further consideration.

In some instance, process rules 225 are rules defined based on a selection of extracted rules from a machine learning model. The selection of the rules may be defined as discussed above and in correspondence with a filtering criteria defined for metrics computed for the decision rules. The process rules 225 may be displayed, for example, at a user interface of an application associated with the workflow service 220. The process rules 225 may be provided for review and selection by an end user 205. The end user 250 may be a process administrator or manager that takes responsibility for the process logic implemented for the workflow service 220.

The process rules 225 may be provided in a selectable form, where the user 205 may select a rule from the process rules 225 and incorporate that rule into implemented process logic 260 for the rules service logic of the workflow service. it is favored to be displayed to the end user.

For example, when decision trees as presented at Table 2, Table 3, and Table 4 are evaluated to determine percentage of coverage of the historical data used for generating the machine learning model with the corresponding rule. As for example the third decision rule covers a third of the historical data, the third decision tree will be displayed to the end user 205. In some examples, decision trees two and three may be considered as candidates that are displayed to the end user 205, whereas decision tree one may be discarded based on evaluation of the trees based on precision, coverage, and complexity.

In accordance with implementations of the present disclosure, based on evaluation of decision trees and rules of a machine learning model, a subset of the rules may be determined to correspond to higher criteria indicators for providing the rule for further evaluation and incorporating the rules in the process logic. In such manner, one a number of rules are evaluated whether they quality for display for a user, and are presented at the process rules 225 on a display view. The user 205 may perform a selection of a rule from the provided pre-filtered set of rules complying the criteria for evaluation. A selected rules may be incorporated and implemented as part of the process rules defined for the workflow service 220. Such implemented rules may be used for automatic executions of instances of the workflow service 220 that do not requires manual interaction.

Figure 3:
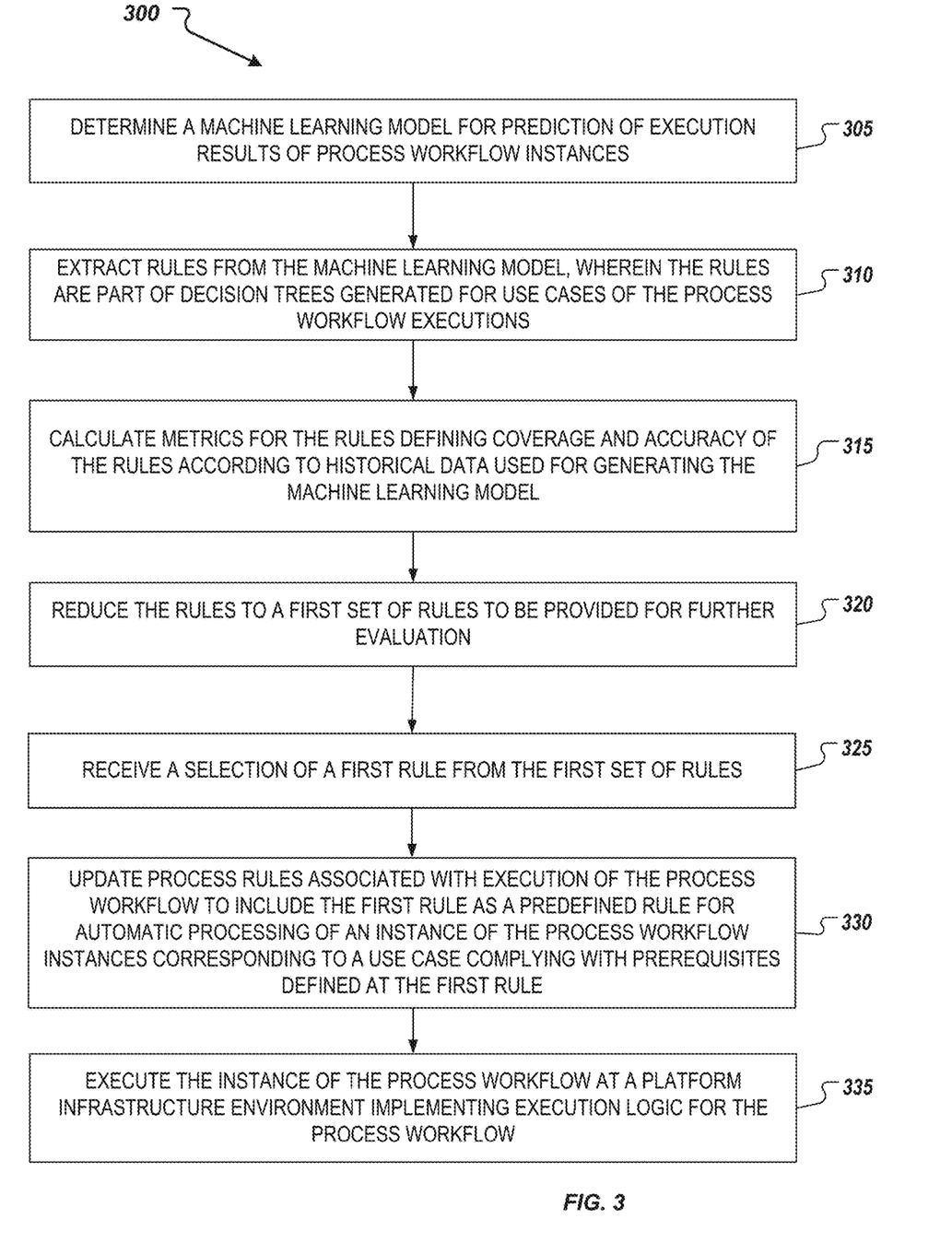
FIG. 3 is a flowchart for an example method for determining process rules for automatic process execution based on evaluation of rules extracted from a machine learning model in accordance with implementations of the present disclosure.

FIG. 3 is a flowchart for an example method 300 for determining process rules for automatic process execution based on evaluation of rules extracted from a machine learning model in accordance with implementations of the present disclosure. It will be understood that method 300 and related methods may be performed, for example, by any suitable system, environment, software, and hardware, or a combination of systems, environments, software, and hardware, as appropriate. In some implementations, the example method 300 and related methods are executed by one or more components of the system 100 described above with respect to FIG. 1, or system 20 described above with respect to FIG. 2.

At 305, a machine learning model for prediction of execution results of process workflow instances is determined. For example, the machine learning model may be for an approval process, such as leave request process, process requisition, etc. The machine learning model may be such as the machine learning model 130 discussed in relation to FIG. 1, the machine learning models 235 discussed in relation to FIG. 2, other. The machine learning model may be built to capture system and user behavior during execution of instances of processes when run at a particular system or multiple systems.

In some instances, the machine learning model may include defined decision trees that are generated based on evaluation of data provided to the machine learning algorithm to train the model. In some instance, the machine learning model comprises a plurality of decision trees to implement logic for evaluation of process data for an instance of a process workflow and to determine predicted output. The decision trees part of the machine learning model include multiple rules for data evaluation. The decision trees may be such as the discussed decision trees above in relation to FIG. 2 and Tables 1, 2, 3, and 4.

The decision trees may be determined based on training the model according a machine algorithm with historical data for past process executions. In some instances, the machine learning model may be trained over historical data, such as collected historical data 150, FIG. 1, to determine the multiple rules and the plurality of decision trees. The historical data may be collected at one or more systems where instances of the process workflow were executed. The multiple rules are determined based on machine learning logic and exclude rules that are predefined for a process workflow as part of the process workflow definition.

At 310, rules from the machine learning model are extracted. The rules may be part of decision trees included in the machine learning models. The rules are generated for use cases of the process workflow execution. For example, the rules include predicates to evaluate process input and navigate to a next step in a process execution.

For example, in a process scenario of a leave request, a feature defining whether a request for vacation by an employee has been approved may be a Boolean variable including 0 for declined vacation requests, and 1 for approved vacation request. The value of the feature for the outcome of the request, namely, the result value, may be dependent on data features such as a number of vacation days taken so far, number of requested days for the vacation, period of the year, employee identification number, employee location, employee position, etc. Such features may be included as conditions in the process execution rules. Some rules may be associated with an automatically defined process execution outcome, other might be linked to other rules from the process execution rules.

At 315, metrics for the rules are calculated. The metrics define coverage and accuracy of the rules according to historical data used for generating the machine learning model. In some instances, the metrics include coverage metrics and accuracy metrics correspondingly defined for the plurality of rule. A coverage metric may be determined for a first rule from the plurality of rules to identify an amount of data from the historical data that complies with the rule. An accuracy metric may be determined for the first rule to identify whether a predicted result acquired according to the first rule corresponds to an actual result as included in the historical data used for generating the decision trees including the rules.

At 320, the rules are reduced to a first set of rules to be provided for further evaluation. In some instances, the first set of rules may be provided, at a user interface application on a display device, for further evaluation for implementation in process rules defined for the process workflow. For example, a process analyzer may evaluate the first set of rules to select a rule that is to be implemented as part of the process rules that are encoded in the process workflow definition.

At 325, a selection of a first rule from the first set of rules is received. The selection may be provided by a service analysis related to the service implementing the process workflow and managing the execution of the process workflow instances.

At 330, process rules associated with execution of the process workflow are updated. The process rules are updated to include the first rule as identified with the received selection at 325. The first rule is included in the process rules as a predefined rule for automatic processing of an instance of the process workflow instances, when the instance corresponds to a use case complying with prerequisites defined at the first rule. For example, the prerequisites may be defined as a predicate or Boolean condition or in any other form identifying requirements for complying with the rule.

In some instances, the first rule is implemented at an process execution engine for automated execution of the instance of the process workflow, for example, when an instance of the process workflow defines a process scenario corresponding the first rule. The process result may be automatically generated during runtime of the process workflow at the process execution engine.

In some instances, as the first rules part of the machine learning model is implemented as part of the process rules, the first rule may be excluded from the machine learning model. In such manner, the machine learning model may be updated and further trained over a set of historical data. The set of historical data used for training the updated machine learning model may be determined to exclude data related to the first rule.

In accordance with implementations of the present application, historical data may be collected and updated iteratively for executed instances of the process workflow. In some instances, rules persisted in the machine learning model may be also iteratively evaluated after updating the machine learning model according to the iteratively collected historical data.

At 335, the instance of the process workflow is executed at a platform infrastructure environment implementing execution logic for the process workflow. For example, the platform infrastructure environment may be such as a service provider environment 110, FIG. 1 or service provider environment 240, FIG. 2. The process workflow instance is executed according to implemented logic that includes processing rule. The processing rules include the first rule as identified based on the evaluation of the rules determined from the machine learning model. When the process workflow instances is determined to correspond to conditions associated with the first rule, the process workflow instance may be executed automatically and a process result may be provided without manual interaction, faster and with less resources spent.

In some instances, the process workflow is an approval process workflow, and the instance of the approval process workflow is executed automatically without manual input to generate an approval process result when input data for executing the instance comply with the first rule as included in the process rules.

Figure 4:
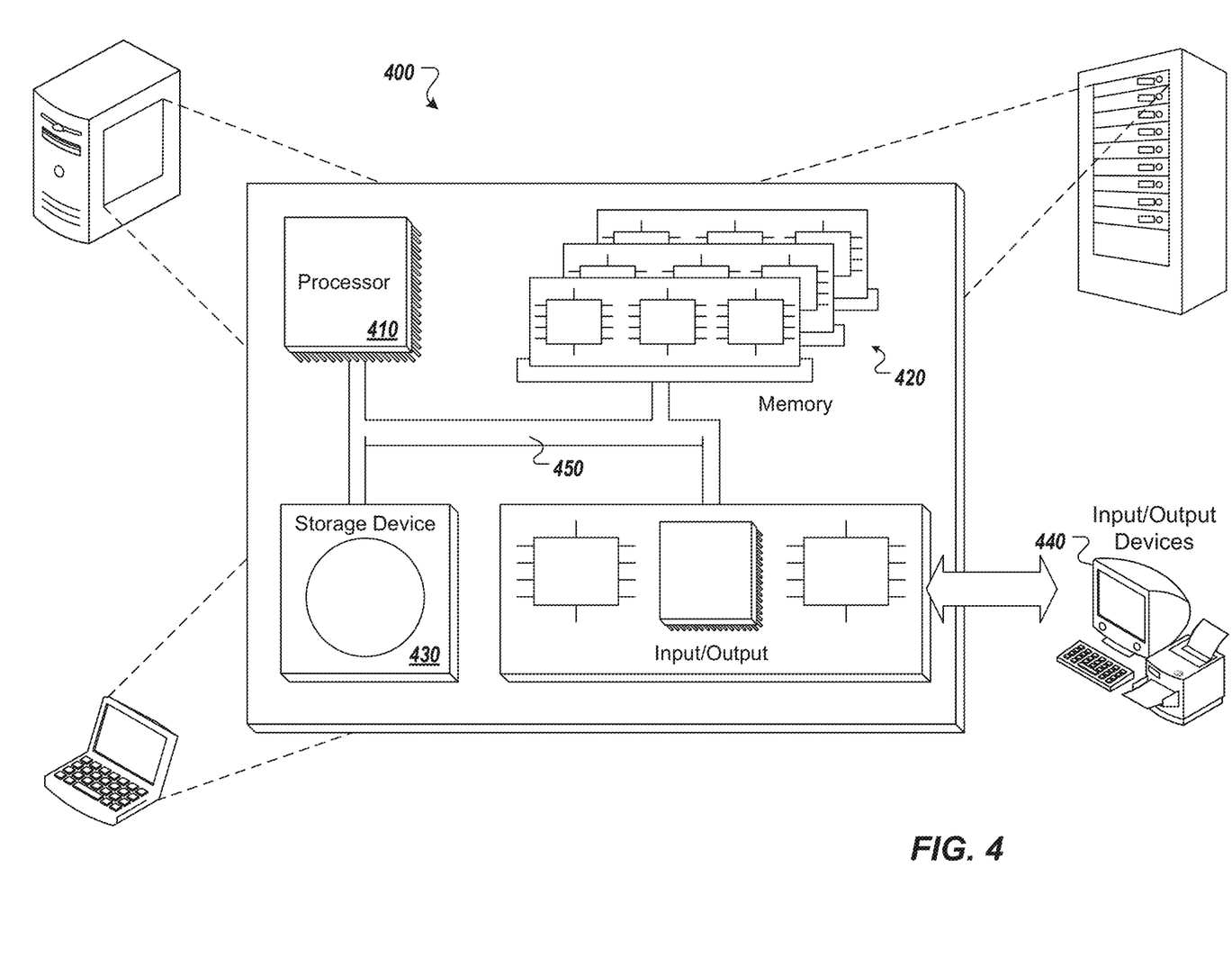
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer implemented method comprising:
   extracting a plurality of rules from a machine learning model for prediction of execution results of instances of a process workflow;
   calculating metrics for the plurality of rules, wherein the metrics define coverage and accuracy of the plurality of rules according to historical data used for generating the machine learning model;
   based on an evaluation of the plurality of rules according to the metrics and a predetermined criteria, reducing the plurality of rules to determine a first set of rules from the plurality of rules to be provided for evaluation and determination of a first rule to be incorporated into process rules defined for the process workflow at a process execution engine;
   in response to providing the first set of rules for the evaluation and determination, receiving a selection of the first rule from the first set of rules; and
   updating process rules associated with execution of the process workflow to include the first rule as a predefined rule for automatic processing of an instance of the process workflow and generating a process result according to the first rule, wherein the instance of the process workflow complies with prerequisites defined at the first rule.

2. The method of claim 1, further comprising:
   generating the machine learning model for predicting of the process workflow, wherein the machine learning model comprises a plurality of decision trees to implement logic for evaluation of process data for an instance of the process workflow and to determine predicted output, and wherein the plurality of decision trees include the plurality of rules for data evaluation.

3. The method of claim 2, further comprising:
   training the machine learning model over the historical data to determine the plurality of rules and the plurality of decision trees, wherein the historical data is collected at one or more systems where instances of the process workflow were executed.

4. The method of claim 1, wherein the metrics include coverage metrics and accuracy metrics correspondingly defined for the plurality of rules, wherein a coverage metric is determined for a first rule from the plurality of rules to identify an amount of data from the historical data that complies with the rule, and wherein an accuracy metric is determined for the first rule to identify whether a predicted result acquired according to the first rule corresponds to an actual result as included in the historical data.

5. The method of claim 1, further comprising:
   providing, at a user interface application on a display device, the first set of rules for further evaluation for implementation in the process rules defined for the process workflow.

6. The method of claim 1, wherein the first rule is implemented at an process execution engine for automated execution of the instance of the process workflow, wherein the instance of the process workflow defines a process scenario corresponding the first rule, and wherein the process result is automatically generated during runtime of the process workflow at the process execution engine.

7. The method of claim 6, further comprising:
   training an updated machine learning model over a set of the historical data, wherein the set is determined by excluding data related to the first rule from the historical data, and wherein the machine learning model is updated to generate an updated machine learning model excluding the first rule from the plurality of rules.

8. The method of claim 6, further comprising:
   collecting and updating iteratively the historical data collected for executed instances of the process workflow; and
   iteratively evaluating rules persisted in the machine learning model after updating the machine learning model according to the iteratively collected historical data.

9. The method of claim 1, further comprising:
   updating the machine learning model to exclude the first rule from the plurality of rules.

10. The method of claim 1, further comprising:
    executing the instance of the process workflow at a platform infrastructure implementing execution logic for the process workflow, wherein the process workflow is an approval process workflow, and wherein the instance of the approval process workflow is executed automatically without manual input to generate an approval process result when input data for executing the instance comply with the first rule.

11. A non-transitory, computer-readable medium storing computer-readable instructions executable by a computer and configured to:
    extract a plurality of rules from a machine learning model for prediction of execution results of instances of a process workflow;
    calculate metrics for the plurality of rules, wherein the metrics define coverage and accuracy of the plurality of rules according to historical data used for generating the machine learning model;
    based on an evaluation of the plurality of rules according to the metrics and a predetermined criteria, reduce the plurality of rules to determine a first set of rules from the plurality of rules to be provided for evaluation and determination of a first rule to be incorporated into process rules defined for the process workflow at a process execution engine;

in response to providing the first set of rules for the evaluation and determination, receive a selection of the first rule from the first set of rules; and update process rules associated with execution of the process workflow to include the first rule as a predefined rule for automatic processing of an instance of the process workflow and generating a process result according to the first rule, wherein the instance of the process workflow complies with prerequisites defined at the first rule.

12. The computer-readable medium of claim 11, further storing instructions configured to:

generate the machine learning model for predicting of the process workflow, wherein the machine learning model comprises a plurality of decision trees to implement logic for evaluation of process data for an instance of the process workflow and to determine predicted output, and wherein the plurality of decision trees include the plurality of rules for data evaluation.

13. The computer-readable medium of claim 11, wherein the metrics include coverage metrics and accuracy metrics correspondingly defined for the plurality of rules, wherein a coverage metric is determined for a first rule from the plurality of rules to identify an amount of data from the historical data that complies with the rule, and wherein an accuracy metric is determined for the first rule to identify whether a predicted result acquired according to the first rule corresponds to an actual result as included in the historical data.

14. The computer-readable medium of claim 11, wherein the first rule is implemented at an process execution engine for automated execution of the instance of the process workflow, wherein the instance of the process workflow defines a process scenario corresponding the first rule, and wherein the process result is automatically generated during runtime of the process workflow at the process execution engine.

15. The computer-readable medium of claim 11, further storing instructions configured to:

train an updated machine learning model over a set of the historical data, wherein the set is determined by excluding data related to the first rule from the historical data, and wherein the machine learning model is updated to generate an updated machine learning model excluding the first rule from the plurality of rules;

collect and update iteratively the historical data collected for executed instances of the process workflow; and iteratively evaluate rules persisted in the machine learning model after updating the machine learning model according to the iteratively collected historical data.

16. The computer-readable medium of claim 11, further storing instructions configured to:

execute the instance of the process workflow at a platform infrastructure implementing execution logic for the process workflow, wherein the process workflow is an approval process workflow, and wherein the instance of the approval process workflow is executed automatically without manual input to generate an approval process result when input data for executing the instance comply with the first rule.

17. A system comprising
a computing device; and
a computer-readable storage device coupled to the computing device and having instructions stored thereon which, when executed by the computing device, cause the computing device to perform operations, the operations comprising:

extracting a plurality of rules from a machine learning model for prediction of execution results of instances of a process workflow;

calculating metrics for the plurality of rules, wherein the metrics define coverage and accuracy of the plurality of rules according to historical data used for generating the machine learning model;

based on an evaluation of the plurality of rules according to the metrics and a predetermined criteria, reducing the plurality of rules to determine a first set of rules from the plurality of rules to be provided for evaluation and determination of a first rule to be incorporated into process rules defined for the process workflow at a process execution engine;

in response to providing the first set of rules for the evaluation and determination, receiving a selection of the first rule from the first set of rules; and updating process rules associated with execution of the process workflow to include the first rule as a predefined rule for automatic processing of an instance of the process workflow and generating a process result according to the first rule, wherein the instance of the process workflow complies with prerequisites defined at the first rule.

18. The system of claim 17, wherein the computer-readable storage device includes further instructions which when executed by the computing device, cause the computing device to perform operations comprising:

generating the machine learning model for predicting of the process workflow, wherein the machine learning model comprises a plurality of decision trees to implement logic for evaluation of process data for an instance of the process workflow and to determine predicted output, and wherein the plurality of decision trees include the plurality of rules for data evaluation, wherein the metrics include coverage metrics and accuracy metrics correspondingly defined for the plurality of rules, wherein a coverage metric is determined for a first rule from s to identify an amount of data from the historical data that complies with the rule, and wherein an accuracy metric is determined for the first rule to identify whether a predicted result acquired according to the first rule corresponds to an actual result as included in the historical data.

19. The system of claim 17, wherein the computer-readable storage device includes further instructions which when executed by the computing device, cause the computing device to perform operations comprising:

training an updated machine learning model over a set of the historical data, wherein the set is determined by excluding data related to the first rule from the historical data, and wherein the machine learning model is updated to generate an updated machine learning model excluding the first rule from the plurality of rules;

collecting and updating iteratively the historical data collected for executed instances of the process workflow; and iteratively evaluating rules persisted in the updated machine learning model according to the iteratively collected historical data.

20. The system of claim 17, wherein the computer-readable storage device includes further instructions which when executed by the computing device, cause the computing device to perform operations comprising:

executing the instance of the process workflow at a platform infrastructure implementing execution logic for the process workflow, wherein the process workflow is an approval process workflow, and wherein the instance of the approval process workflow is executed automatically without manual input to generate an approval process result when input data for executing the instance comply with the first rule.

* * * * *